United States Patent
Comsa et al.

(10) Patent No.: US 12,452,801 B2
(45) Date of Patent: Oct. 21, 2025

(54) SPECIFIC ABSORPTION RATE AND MAXIMUM PERMITTED EXPOSURE MITIGATION

(71) Applicant: InterDigital Patent Holdings, Inc., Wilmington, DE (US)

(72) Inventors: Virgil Comsa, Montreal (CA); Paul Marinier, Brossard (CA); Afshin Haghighat, Ile-Bizard (CA); Moon-il Lee, Melville, NY (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 400 days.

(21) Appl. No.: 17/765,344

(22) PCT Filed: Oct. 1, 2020

(86) PCT No.: PCT/US2020/053676
§ 371 (c)(1),
(2) Date: Mar. 30, 2022

(87) PCT Pub. No.: WO2021/067529
PCT Pub. Date: Apr. 8, 2021

(65) Prior Publication Data
US 2022/0377681 A1 Nov. 24, 2022

Related U.S. Application Data

(60) Provisional application No. 62/930,737, filed on Nov. 5, 2019, provisional application No. 62/908,998, filed on Oct. 1, 2019.

(51) Int. Cl.
*H04W 52/36* (2009.01)
*H04W 24/10* (2009.01)

(52) U.S. Cl.
CPC ......... *H04W 52/367* (2013.01); *H04W 24/10* (2013.01); *H04W 52/365* (2013.01)

(58) Field of Classification Search
CPC . H04W 52/367; H04W 24/10; H04W 52/365; H04B 17/24; H04B 17/318
See application file for complete search history.

(56) References Cited

U.S. PATENT DOCUMENTS

| 10,652,833 | B2* | 5/2020 | Nadakuduti | .......... H04W 52/38 |
| 2002/0081978 | A1* | 6/2002 | Hou | ..................... H04B 17/102 |
| | | | | 455/67.11 |

(Continued)

OTHER PUBLICATIONS

3rd Generation Partnership Project (3GPP), R1-1902768, "Consideration on Beam Measurement and Reporting Enhancement", Apple Inc., 3GPP TSG RAN WG1 #96, Athens, Greece, Feb. 25-Mar. 1, 2019, pp. 1-9.

(Continued)

*Primary Examiner* — Abdullahi E Salad
(74) *Attorney, Agent, or Firm* — Condo Roccia Koptiw LLP (57) ABSTRACT

Systems for performing radiation exposure monitoring that accommodate operating in multiple frequency bands are provided. A WTRU may be configured to monitor radiation exposure by determining an averaged power over an evaluation period. The radiation may be measured over a moving averaging window. The averaged measured power may be compared against SAR or MPE limits which may be defined in terms of normalized fractions or ratios in dB. The WTRU may be configured to measure for an averaged power periodically and/or in response to triggers.

18 Claims, 4 Drawing Sheets

(56) References Cited

U.S. PATENT DOCUMENTS

2018/0167897 A1* 6/2018 Sampath ............... H04W 72/12
2020/0015171 A1* 1/2020 Nadakuduti .......... H04W 52/38

OTHER PUBLICATIONS

3rd Generation Partnership Project (3GPP), R4-1910278, "Mitigating Radio Link Failures Due to MPE on FR2", Nokia, Nokia Shanghai Bell, 3GPP TSG-RAN WG4 Meeting #92, Ljubljana, Slovenia, Aug. 26-30, 2019, 5 pages.

ICNIRP Guidelines, "Guidelines for Limiting Exposure to Time-Varying Electric, Magnetic and Electromagnetic Fields (Up to 300 GHZ)", International Commission on Non-Ionizing Radiation Protection, Health Physics, vol. 74, No. 4, 1998, pp. 494-522.

* cited by examiner

SPECIFIC ABSORPTION RATE AND MAXIMUM PERMITTED EXPOSURE MITIGATION

CROSS-REFERENCE TO RELATED APPLICATIONS

This application is the National Stage Entry under 35 U.S.C. § 371 of Patent Cooperation Treaty Application No. PCT/US2020/053676, filed Oct. 1, 2020, which claims the benefit of U.S. Provisional Patent Application No. 62/908,998, filed Oct. 1, 2019, and U.S. Provisional Patent Application No. 62/930,737, filed Nov. 5, 2019, the contents of all of which are hereby incorporated by reference herein in their entireties.

BACKGROUND

Wireless communication devices may establish communications with other devices and data networks via various access networks. For example, a wireless communication device may establish communications via a 3GPP radio access network (RAN). A wireless communication device may access a 3GPP network in order to communicate with other wireless devices and to access data networks communicatively coupled with the 3GPP RAN.

SUMMARY

Systems, methods, and instrumentalities are disclosed that are associated with specific absorption rate (SAR) and maximum permitted exposure (MPE) regulatory requirements. A WTRU may generate and/or send a report to a network entity. The report may include power density information associated with the WTRU.

The WTRU may determine a duty cycle, which may be, for example, a reference duty cycle. The WTRU may determine a power density value (e.g., associated with an SAR and/or an MPE associated with the WTRU). The power density value may be a power density threshold value. The power density value may be an MPE value. The WTRU may determine a measured power density associated with the duty cycle. The measured power density may be associated with measurements taken over the duty cycle (e.g., a period of time). The WTRU may determine whether the measured power density satisfies a threshold fraction of the power density value. If the measured power density satisfies the threshold fraction of the power density value, the WTRU may generate a report associated with the determination that the measured power density satisfies the threshold fraction of the power density value. The report may indicate an available power density (e.g., a value that represents a difference between the measured power density and a maximum power density). The available power density may be indicated as a fraction of the power density value. The WTRU may send the report to a network entity.

The WTRU may initiate a timer that is associated with sending the report to the network entity (e.g., initiate the timer at or around the time of sending the report). If the WTRU receives an acknowledgment before the timer reaches a threshold, the WTRU may apply a modified configuration (e.g., associated with transmission power). The modified configuration may be received from the network entity. If the timer reaches the threshold, the WTRU may perform a reduction in power (e.g., a preconfigured or default reduction).

This Summary is provided to introduce a selection of concepts in a simplified form that are further described herein in the Detailed Description. This Summary is not intended to limit the scope of the claimed subject matter. Other features are described herein.

DETAILED DESCRIPTION

Disclosed herein are systems and implementations for performing radiation exposure monitoring that accommodate operating in multiple frequency bands. A WTRU may be configured to monitor radiation exposure by determining an averaged power over an evaluation period. The radiation may be measured over a moving averaging window. The averaged measured power may be compared against SAR and/or MPE limits which may be defined in terms of normalized fractions or ratios in dB. The WTRU may be configured to measure for an averaged power periodically and/or in response to triggers.

Figure 1A:
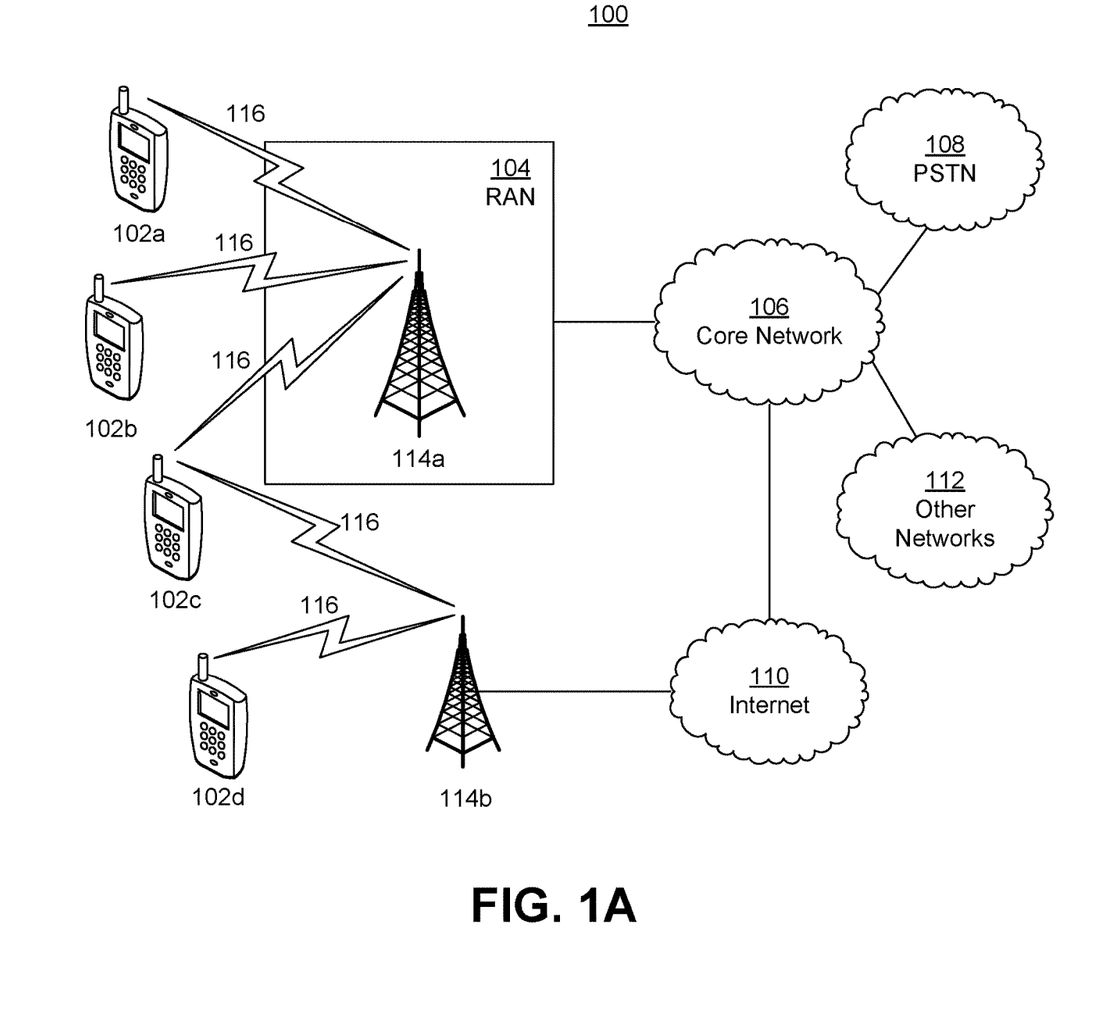
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an encode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
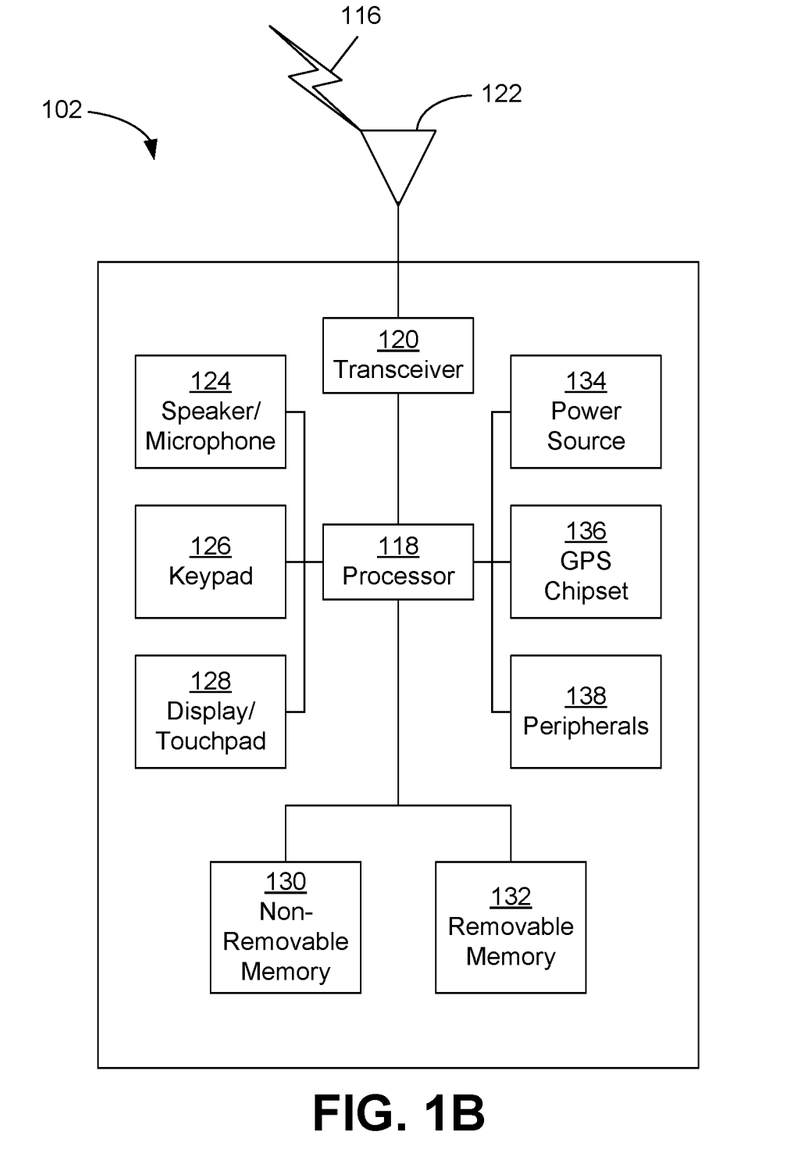
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
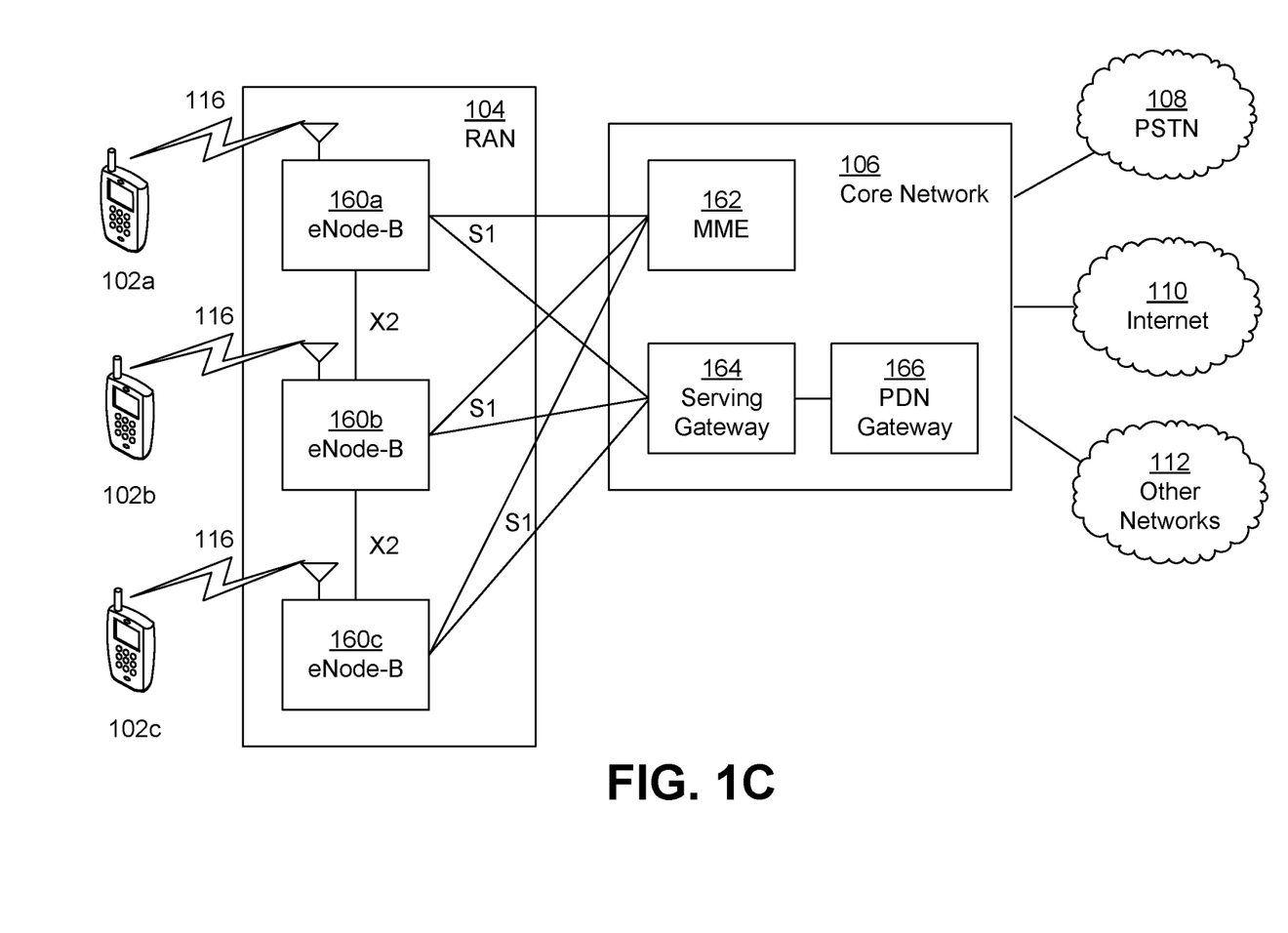
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
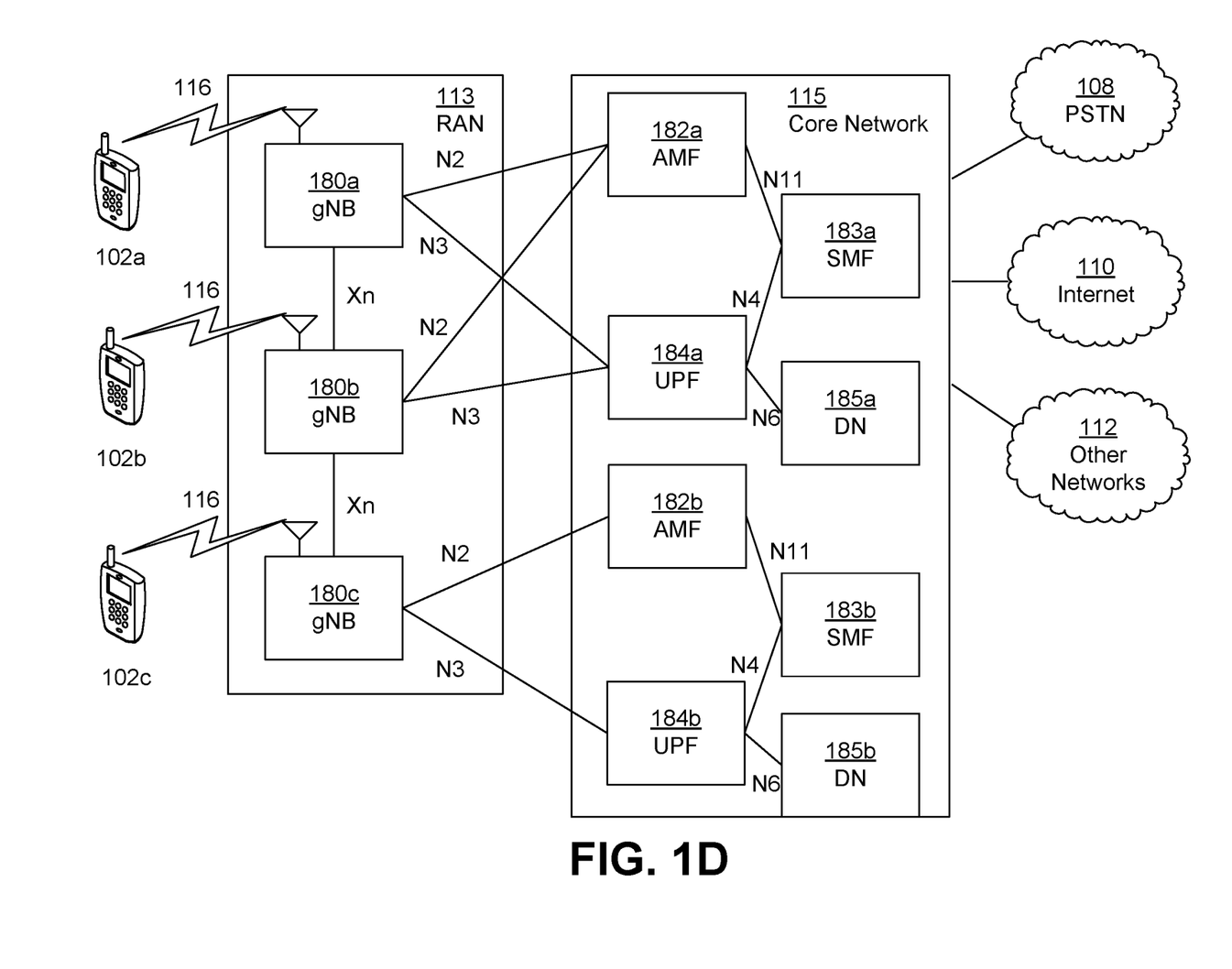
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are disclosed that are associated with specific absorption rate (SAR) and maximum permitted exposure (MPE) regulatory requirements. A WTRU may generate and/or send a report to a network entity. The report may include power density information associated with the WTRU.

The WTRU may determine a reference duty cycle. The WTRU may determine a power density value (e.g., associated with an SAR and/or an MPE associated with the WTRU). The power density value may be a power density threshold value. The power density value may be an MPE value. The WTRU may determine a measured power density associated with the reference duty cycle. The measured power density may be associated with measurements taken over the reference duty cycle (e.g., a period of time). The WTRU may determine whether the measured power density satisfies a threshold fraction of the power density value. If the measured power density satisfies the threshold fraction of the power density value, the WTRU may generate a report associated with the determination that the measured power density satisfies the threshold fraction of the power density value. The report may indicate an available power density (e.g., a value that represents a difference between the measured power density and a maximum power density). The available power density may be indicated as a fraction of the power density value. The WTRU may send the report to a network entity. In examples, the report may allow the network entity to adjust parameter(s) associated with the WTRU to mitigate changes that may otherwise cause the WTRU to lose a connection with the network.

The WTRU may initiate a timer that is associated with sending the report to the network entity (e.g., initiate the timer at or around the time of sending the report). If the WTRU receives an acknowledgment before the timer reaches a threshold, the WTRU may apply a modified configuration (e.g., associated with transmission power). The modified configuration may be received from the network entity. If the timer reaches the threshold, the WTRU may perform a reduction in power (e.g., a preconfigured or default reduction).

Disclosed herein are implementations associated with performing radiation exposure monitoring that may accommodate operating in multiple frequency bands. A WTRU may be configured to monitor radiation exposure by determining an averaged power, e.g., over an evaluation period. The radiation may be measured over a moving averaging window. The averaged measured power may be compared against SAR or MPE limits, e.g., which may be defined in terms of normalized fractions or ratios in dB. The WTRU may be configured to measure for an averaged power periodically and/or in response to triggers.

A WTRU may be configured to receive a fallback configuration for use when Power Management Maximum Power Reduction (P-MPR) is determined to apply in response to a radiation limit having been exceeded. The WTRU may be configured to switch its transmission parameters as specified in the received fallback configuration. The transmission parameters may require a lesser amount of transmission power.

A WTRU, upon determining P-MPR has been triggered, may be configured to apply one or more priority rules for determining whether to maintain and/or drop particular transmissions of a plurality of transmissions. The WTRU may apply the priority rule to determine one or more transmissions of lower priority and may drop those lower priority transmissions rather than high priority transmissions.

A WTRU may be configured to apply an enhanced level of power reduction where the level of reduction may vary as a function of a time pattern. The WTRU may be configured to apply a level of power reduction up to a maximum level during timer intervals defined by the pattern, while in other time instances, the WTRU may apply an arbitrary amount of power reduction such that the SAR and/or MPE requirements are satisfied when considering an average over a longer time window. The WTRU may be configured with a set of logical channel restrictions associated with the time pattern. The WTRU may apply the logical channel restrictions to restrict data from a logical channel from being multiplexed in a grant received during an occasion in the time pattern. The restriction may be explicit or implicit based upon a logical channel priority or type.

Users of mobile devices may experience incidental radiation while operating mobile devices. Mobile devices and corresponding network communications equipment may be configured to limit this incidental radiation. Mobile devices may be configured to sense the amount of radiation experienced by the devices and, upon determining a limit has been exceeded, may enter a reduced power mode and thereby reduce the amount of radiation experienced by the user. Mobile devices may operate using one or more frequency ranges. Radio wave frequencies below 6 GHz, which may be referred to as Frequency Range 1 ("FR1"), are used for cellular communications. Attempts have been made to set limits regarding safe exposure to radio frequency energy in connection with cellular communication. These limits may be specified in terms of units referred to Specific Absorption Rate ("SAR"), which is a measure of the amount of radio frequency energy absorbed by a body when using a mobile phone. SAR may be measured as a ratio of power in milliWatts (mW), for example, to mass in grams (g) or kilograms (kg), for example. Countries, administrations, and regions regulate SAR limits and test mobile phones against SAR limits in connection with certifying phones.

The radio wave frequency range of 24-52 GHz, which may be referred to as Frequency Range 2 ("FR2"), has been discussed in connection with the $3^{rd}$ Generation Partnership Project ("3GPP") releases 15 (REL-15) and 16 (Rel-16). The effect of millimeter wave (mmW) transmissions associated with FR2 may be accounted for in wireless communication. In this spectrum range, the radiated power may have a pellicular effect such as, for example, a superficial skin thermal effect which may be, for example, an increase in temperature. The scientific community defined a limit for the radiation above 10 GHz in terms of Maximum Permitted Exposure ("MPE") which may be measured as a power density.

3GPP specifies that for frequencies below 6 GHz, Power Management Maximum Power Reduction ("P-MPR") may be applied for SAR mitigation and may be triggered by proximity sensors. The power reduction may be reported to a base station through an enhanced power headroom report (PHR) where P-MPR specific action may be signaled by a flag. A delay of a few tens of milliseconds may exist between the SAR limit triggered action and the PHR report, e.g., according to 3GPP technical specifications.

With respect to FR2, the ability to employ beamforming complicates MPE mitigation. Due to the highly directional nature of beamforming, that P-MPR reductions may not be efficient on their own due to the sensors not properly detecting human proximity in conjunction with the beam spatial orientation. The WTRU may declare as a WTRU capability a maximum UL duty cycle, maxUplinkDuty-Cycle-FR2, for which the WTRU is MPE limit compliant. The base station's scheduler is not bounded by this limit, so a WTRU that has its duty cycle MPE compliant limit exceeded may further apply the P-MPR technique.

In examples, there may be MPE mitigation involving physical layer reporting for fast reaction or embedded PHR (MAC layer) with early triggering and WTRU assistance information.

The static nature of the WTRU capability as a maximum UL duty cycle may artificially limit the UL data throughput, e.g., when the human user is not in the proximity of the radiating device. The P-MPR power reduction may be significant and may lead to UL radio link failure ("RLF") and connection releases from the network side. The P-MPR signaling may be triggered after the reduction is applied and after a few tens of milliseconds, which may lead to a possible UL RLF due to the beamforming being highly directional and fast changing.

The combined SAR and MPE effect that may need to be accounted for when simultaneous UL transmissions occur on both FR1 and FR2 may be a limitation. The relation between these two different limits may be formulated as shown in equation (1):

$$\sum_{i=1\,Hz}^{10\,GHz}(SAR_i/SARL)+\sum_{i=10\,GHz}^{300\,GHz}(S_i/Sl)<1 \quad (1)$$

where: SARi is the SAR caused by exposure at frequency i; SARL is the SAR limit;
Sl is the power density limit; and
Si is the power density at frequency i.

As demonstrated by equation (1), a frequency split derives from safety compliance range limits. It may be understood that FR1 may be a subset of a frequency range reaching up to 10 GHz, while FR2 may extend beyond 10 GHz up to 300 GHz.

In examples, the SAR may be mitigated in FR1 by implementing P-MPR. The reduction in power may be reported as a reduction term in dB units using a MAC CE as PHR and may be defined over a subframe or slot.

The SAR/MPE inequality represented in equation (1) may translate into a limit that may be met over a certain evaluation period and over a certain number of frequencies. Among other things, feature(s) may be associated with maintaining a predictable UL performance, e.g., while satisfying the safety limits.

In examples, there may be different SAR and MPE evaluation periods. SAR may be evaluated as an average over 6 minutes, while MPE may have a frequency dependent period of 68/f, when f is the frequency in GHz.

In examples, the impact may be evaluated with a granularity of 1 second (s) for improved results.

One or more features herein may be associated with the combined effect of SAR/MPE limits in the context of E-UTRAN New Radio Dual Connectivity ("EN-DC"), New Radio Dual Connectivity ("NR-DC"), and/or New Radio intra band Carrier Aggregation ("NR CA"). EN-DC and NR-DC may involve two different schedulers, and, may require a different level of information. NR CA may involve a single scheduler, e.g., that may react differently and more quickly.

The disclosed implementations may be applied for a single branch on FR1 or FR2, or as a combined solution as demonstrated by the condition expressed in the inequality of equation (1).

Physical layer, MAC, and/or RRC signaling may be designed, for example, in a way that the UL radio links may be preserved, e.g., in a functional way.

Quantities normalization may be applied. One issue to be addressed relates to the quantities to be reported dynamically by the WTRU when SAR and MPE are triggered. Normalized values may be identified and/or defined that may be summed up and compared to unity as suggested by the inequality expressed in equation (1).

For MPE, the duty cycle may be a normalized value. If the WTRU capability in maxUplinkDutyCycle-FR2 is taken as a reference for MPE compliance, when signaled by the WTRU, this value may be understood as the maximum duty cycle usable by the WTRU in proximity to a human and in the absence of FR1 simultaneous transmissions over a defined period.

For normalization processing in connection with FR1 and SAR, a ratio between the power level and the SAR safety power level may be considered under a 100% duty cycle assumption or any maximum percentage, X %, of a duty cycle, e.g., for TDD configurations, for example.

If a WTRU form factor has the SAR safety power level equal to its Power Class, the 100% duty cycle may have a ratio equal to 1. It may be the case, for example, that WTRUs with portable PC3 equal to 23 dBm may have antennas designed for SAR limit compliance. When the ratio reaches 1 for a time defined evaluation window, the FR2 transmissions, which may be MPE related, may be stopped for a prescribed amount of time, e.g., in order to comply with the inequality of equation (1).

A maximum duty cycle may be 50% for a TDD system with a PC2 equal to 26 dBm where the SAR related ratio is 1 and there is an absence of FR2 UL simultaneous transmissions.

An SAR limit related to the power class under a specific assumption of a designated percentage (X %) duty cycle may be needed for the scheduler in order to facilitate the UL power evaluation for the UL grants calculation and/or allocation. For FR1, an SAR compliant maximum UL duty cycle may be defined similarly to the FR2 case that may be related as well to the SAR limit. This may be communicated in addition to the WTRU capability.

If multiple uplinks on multiple bands are configured, depending on the band's location in FR1 or FR2, multiple SARi or MPEi related entities may be defined, configured, and/or used by the system by generalizing the usage as suggested by summations per frequency range specified in the inequality of equation (1).

SAR and MPE compliance limits may be signaled as WTRU capabilities. For example, for FR1, a WTRU may signal an SAR limit which may be assumed by the network as the SAR power level limit over a duty cycle of 100%. The WTRU may signal an SAR power limit and a maximum duty cycle, e.g., 50%, to which the SAR power limit applies. The WTRU may signal a list of power levels and related duty cycles (in pairs) that are to be SAR limit compliant. The power levels and corresponding duty cycles may be, for example, the result of lab calibrations. The WTRU may signal a list of pointers to pre-defined levels and duty-cycles.

For FR2, a WTRU may have an MPE limit compliant maximum duty cycle capability that is related to the WTRU power class. Pairs of WTRU MPE limits for a number of duty cycles may, e.g., may alternatively, be signaled.

These defined quantities may be signaled dynamically by a WTRU in response to a Reconfiguration RRC message signaling EN-DC, NR-DC, NE-DC or NR CA configuration having at least two ULs in two different ranges FR1 and FR2 subject to SAR and PME limitations.

The normalized quantities may be defined in the system dynamically, e.g., associated with EN-DC, NR-DC, NE-DC or NR CA configuration, and may be used dynamically, e.g., similarly to the reporting of PHR rules.

Signal assistance information and/or triggering conditions may be used. The UL power measurements that a WTRU performs for SARi and MPEi evaluations may be taken and averaged over a time interval that may be short term, e.g., a few tens or hundreds of milliseconds, or long term, e.g., one or more seconds. Whether the interval is short term or long term may be related to the frequency range. The averaged measured power over the UL counted duty cycle may be compared with the SAR or MPE defined safety level limits or safety thresholds, e.g., defined or configured by the network. The safety limits or thresholds may be defined in terms of normalized fractions or ratios in dB and may be independent of WTRU internal safety calibrations and may be applicable to any WTRU. The limits may be communicated to the network and may be specified by WTRU capabilities such as, for example, a maximum duty cycle.

The measurements averaging window may be configured by the network according to specific rules for each frequency range. If the WRU is configured with multiple UL serving cells per frequency range, the measurements may be performed per UL serving cell, or globally as an average over the active UL serving cells in a specific frequency range.

If the WTRU reports the safety levels or headrooms that may be triggered, periodically reported, or triggered for periodic reporting, the network may pre-emptively adjust or adapt its scheduling over FR1 and FR2 uplinks, e.g., so that the safety levels may be met without applying disruptive solutions such as, for example, large P-MPR or dropping transmissions on certain UL(s) which may cause UL RLF or connection releases.

The moving average SARi or MPEi may be an UL power average over a defined measurement period. Based on the moving average window measurements for SAR and MPE, the WTRU may report a safety headroom against SAR and MPE limits or a network configured (by RRC, for example) threshold. The safety headroom may be reported, for example, as a pure fraction or ratio (dB) such as SARi/SARL and/or MPEi/MPEL. The safety headroom may be reported, for example, as a fraction or ratio (dB) such as, for example, SARi/SARL, MPEi/MPEL, divided by a target threshold, e.g., safety headroom, that may be a fraction or a ratio in dB of the safety level.

For EN-DC or NR-DC configurations, the WTRU may signal SAR and MPE assistance information to base stations and/or schedulers. Each base station involved in EN-DC or NR-DC operations may need to know at least the status or situation of the other safety headroom since there are two schedulers that need to manage their uplink transmissions in conjunction with the available power and time related resources. This reporting may provide a smooth convergence to balanced UL transmissions over FR1 and FR2, e.g., while possibly avoiding UL transmissions disruption.

Safety headroom configurations may be provided for cells, cell groups, and/or frequency ranges. The safety headroom for SAR/MPE reporting may be configured per UL active serving cell on FR1 and FR2 respectively. In a scenario where FR1 and FR2 may have their uplinks configured as groups, the SAR/MPE reporting may be performed per cell and/or group as SARi, j and MPE l, k, meaning SARi of the active cells i that belong to group j, and MPE of the cells l that belong to group k. These rules may be related to groups of cells that belong to a scheduler and a band under FR1 or FR2. The safety headroom may be configured and reported per UL bandwidth part.

The SAR and MPE normalized safety headroom may be signaled with a certain granularity that may be a fraction or percentage. The safety headroom may be a rounded-up value from a discreet list such as, for example, (0, 20, 40, 60, 80). The safety headroom may be a single value that may play the role of a safety threshold. The list of values may be expressed in dB if ratios are used for safety levels or a threshold in dB. The WTRU may use a pointer to the list or simply a flag, e.g., if a single configured or WTRU-declared threshold value is used. The granularity of the safety headroom may be in the current specified range of a PHR report in dB power levels or fractions of 64 values.

The granularity may be defined as a list of values that may cover, e.g., only cover, the upper utilization range as a safety headroom (e.g., 0%, 10%, 20%, 30%, 40%) and may be triggered after, e.g., only after, SAR safety headroom or MPE safety headroom goes below a certain threshold such as, for example, 50% and may reach at least 40% for a defined period called safety headroom evaluation window.

Since safety headroom values may be useful when the WTRU is in vicinity of a human body, periodic SAR and/or MPE reports may be triggered if, e.g., only if, in vicinity of a human. When the WTRU is not in proximity of a human, the WTRU may use its entire physical transmission capabilities.

Evaluation periods may be employed. The WTRU may use a single evaluation period, Te, as the moving average window common to both FR1 and FR2 ranges. When a single evaluation period, Te, is used, the average window may be fully overlapping between FR1 and FR2. The UL transmission counters for averages may follow their respective slot numerology boundaries.

The evaluation period Te may correspond to a periodic reporting timer that may be unique or configured by the network. This evaluation period may cover FR1 and FR2.

FR1 and FR2 may have different evaluation periods, Tes and Tem, respectively. Different averaging windows lengths may be a valid implementation due to different numerologies or due to the different physical propagation conditions such as, for example, the beamforming in FR2. A short evaluation period may be optimal for FR2 MPE related evaluation in tens or hundreds of milliseconds, while a long evaluation period may be suitable for FR1 SAR.

The WTRU may signal its normalized safety limits for SAR and/or MPE levels as a WTRU capability. The WTRU assisted information may comprise a TDD pattern and an offset in slot(s) for the other UL. This may assist the other base station in increasing, e.g., maximizing, the utilization of the UL power for each UL if they do not overlap. A message may be triggered when a TDD pattern would change in one or both legs, e.g., dynamically.

Triggers and/or timers may be employed. It may not be necessary in all circumstances to have SAR and MPE related measurements. Accordingly, it may be useful to have such measurements triggered, performed periodically, or triggered periodically.

The WTRU may begin performing SAR/MPE window averaged measurements, e.g., if it receives a network configuration that requires these measurements, for example after a human body is detected to be in proximity. The network configuration may include a headroom threshold for one or both of SAR and MPE and/or the related evaluation periods, and the related timers for periodic reporting or triggered reporting may be included.

The periodic reporting may be triggered by one or more of the following triggering conditions that are true for a certain amount of time which may be referred to as evaluation monitoring triggering time (e.g., Ttrig_eval_mon): MPE safety headroom threshold reached for the evaluation period Tem; SAR safety headroom threshold reached for the evaluation period Tes; MPE safety headroom threshold reached, or SAR safety headroom threshold reached for the common evaluation period Te; and SAR safety headroom threshold and MPE safety headroom threshold reached a certain percentage of maximum (100%) or minimum level (0%) for the evaluation period Te, e.g., depending on the manner of accounting for measurement.

The network may configure the WTRU with SAR and/or MPE periodic reports, e.g., similarly to the PHR reports, which may have their own timers, prohibit timers, and/or trigger rules as explained herein. The WTRU may start sending SAR/MPE reports on a condition that a threshold for the SAR/MPE or SAR+MPE is reached, e.g., while the human body is sensed to be in proximity. The threshold may be network configured or a value declared by the WTRU as a WTRU capability. The report may be made periodically for an evaluation period Te or for a period consisting of multiple evaluation periods Tes. The removal of a human proximity condition may be signaled after a prohibit timer expires, e.g., in order to lessen the occurrence of ping-pong situations resulting from human proximity being detected on and off with short periods in-between.

The WTRU may signal the quantities described herein as a designed headroom PHR, e.g., on a control channel, or on MAC-CE based on defined normalized quantities.

The signaled safety headroom quantities may be sent over the physical layer control channel and may be signaled before applying certain actions, e.g., extreme actions, such as P-MPR or shutting down FR2, for example, as explained herein. This information, e.g., signaled safety headroom quantities, may be carried in the CSI feedback.

Once a safety headroom event for SAR, MPE, or both has been triggered, the network may choose to reconfigure the WRU with a different UL/DL ratio and/or to change its scheduling strategy, e.g., while re-balancing the UL radio link throughput.

A low threshold for normalized MPE and/or SAR levels may be added to the safety headroom design, e.g., in order to preserve some guaranteed transmission time over a certain period, Te, Tes, or Tem, that would preserve at least the SRBs, for example, and the UL radio control links integrity or some high priority grants or transmissions like URLLC for example.

The low available power threshold on MPE and/or SAR may be triggered in the same fashion as the safety headroom implementations described herein when the UL transmissions on a certain frequency range on one side reaches a level that may affect the integrity of further transmissions on the other frequency range or cell group under a range. The preserved power for one group may be affected for more than a certain amount of time, e.g. an evaluation period or a multiple of an evaluation period.

The WTRU may report an event when the conditions are met, e.g., for the duration of the Ttrig_eval_mon. This event report may include the SAR and MPE measured quantities as described herein. If the SAR/MPR reporting pre-conditions are known by the network, e.g., from WTRU capabilities or a network configured unique threshold, this event may be signaled, for example, using a single bit such as a flag.

RRC signaling may be used if a new event is created or configured for the SAR/MPE related operations. The safety headroom may not be a UL disruptive event. It may prevent a disruptive event, e.g., so the network may have enough time to reconfigure the WTRU by removing a cell or performing a hand over based on this event.

When the WTRU is RRC reconfigured to mitigate an UL duty cycle that may be changed by, e.g., only by, RRC reconfiguration, an activation offset of the configuration may allow finishing, e.g., essentially all, ongoing HARQ processes, including ACK/NAK transmissions, e.g., buffer flushing may not occur. The triggered RRC reconfiguration may take place, e.g., immediately, and the buffers may be flushed.

P-MPR operations may be employed in conjunction with SAR and MPE measurements and reporting. P-MPR operations may remain and may be maintained as a separate operation used as a safety net for situations where the network reaction may be too slow.

When P-MPR action is taken on FR1, FR2, or both, along with PHR being triggered by P-MPR on a branch (e.g., FR1 or FR2 or both FR1 and FR2), the safety headroom for both SAR and MPE may be triggered and reported, e.g., so that the base stations scheduler may make the appropriate scheduling decisions in terms of duty cycles, UL grants, and load balancing.

The following P-MPR operation may be executed when SAR/MPE measurement and reporting are configured. The network may configure a P-MPR application delay timer. The timer may be started upon an SAR/MPE related triggered measurement reporting. The WTRU may expect a network scheduling reaction. The WTRU may signal to the network the SAR/MPE event due to human body proximity and may start the timer. While the timer for P-MPR delay is running, the WTRU may continue its window averaged measurements and if, after a network configured time interval Te or numbers of consecutive Tes, the SAR/MPE triggered condition did not reset, the WTRU may apply the P-MPR. The SAR/MPE triggered condition may be reset by a network DL/UL reconfiguration or activation/deactivation operation, e.g., deactivating an SCell or a bandwidth part, while the WTRU may continue to report the safety headroom if the human proximity is still detected.

Connectivity may be maintained in case P-MPR is applied. A WTRU may receive a fallback configuration for use when it may need to implement a P-MPR. A WTRU may receive the fallback configuration through, for example, RRC signaling or L1/L2 signaling.

The SAR/MPE event may be signaled to the network. This may be done through L1/2 signaling or RRC. The fallback configuration may be applied by the WTRU on a condition that an acknowledgement from the network is received enabling switching of the fallback configuration. The fallback configuration may be overwritten by the network through an explicit reconfiguration message.

A fallback configuration may have an activation time delay, e.g., that may allow for ongoing HARQ buffers and pending retransmissions to be cleared.

The fallback activation time may mark a soft buffer reset, e.g., before initiating and activating a new configuration that may have a different timeline for DL/UL duty cycles, active bandwidth parts, active UL serving cells, and/or cell groups.

If a WTRU detects proximity of human body, it may switch its transmission parameters according to the configured fallback configuration. The configured fallback transmission may define a set of transmission parameters by which a WTRU may require a lesser amount of transmission power. Application of a P-MPR power offset may have less impact on the WTRU's transmission quality.

The fallback configuration may include transmission parameter(s) that may include one or more of the following: MCS, rank, frequency/time resources, DMRS configuration, etc. A fallback configuration may include one or more preconfigured transmission grants which may include dedicated frequency and/or time resources for fallback transmission. A WTRU may implicitly indicate use of fallback mode by use of dedicated transmission resources. The DMRS configuration defined in the fallback may be different than the original transmission configuration. The DMRS configured for the fallback mode may be different in one or more of the following: pattern, sequence, number of ports, etc. A WTRU may use a different DMRS configuration to implicitly indicate transmission in a fallback mode.

A fallback configuration may be defined according to the reported maxUplinkDutyCycle-FR2. A WTRU may be configured with more than one fallback configuration where each configuration may be applied for at least one maxUplinkDutyCycle-FR2. A WTRU may apply the configured fallback transmission if it receives a transmission configuration that is beyond its reported maxUplinkDutyCycle-FR2 capability.

A WTRU may provide an advance indication to a gNB when its power approaches a preconfigured power threshold where applying a P-MPR may result in a link failure. The advance indication may be implicitly or explicitly indicated using, for example, a PHR report. Upon receiving the indication, the gNB may send to a WTRU a new transmission configuration with a reduced power requirement or may send an indication to use a fallback configuration.

From a gNB decoding perspective, the gNB may attempt one or more of the following implementations. If a fallback mode is preconfigured, the gNB may attempt decoding using a fallback configuration if decoding using the scheduled configuration fails. The WTRU may signal the configuration change (e.g., explicitly) prior to the transmission. A WTRU may implicitly indicate use of the fallback mode transmission by using a variation of one of the configured transmission parameters such as, for example, a DMRS pattern.

Priority rules for dropping transmissions may be employed. When application of a P-MPR power offset is triggered, in exchange for reducing the transmission power, a WTRU may consider a priority rule for keeping or dropping a transmission. When multiple simultaneous transmissions such as PUSCH/PUCCH/PRACH/SRS transmissions are scheduled, a WTRU may drop a transmission of lower priority in favor of a higher priority transmission.

In a single cell operation with two uplink carriers or for operation with carrier aggregation, if application of an P-MPR power offset is triggered, a WTRU may continue with the transmission of a higher priority, and may drop another transmission or may reduce the power of another transmission, e.g., according to the following order: PRACH transmission on the PCell; PUCCH transmission with HARQ-ACK information and/or SR or PUSCH transmission with HARQ-ACK information; PUCCH transmission with CSI or PUSCH transmission with CSI; PUSCH transmission without HARQ-ACK information or CSI; SRS transmission, with aperiodic SRS having higher priority than semi-persistent and/or periodic SRS, or PRACH transmission on a serving cell other than the PCell.

For communications with the same priority order and for operation with carrier aggregation, the WTRU may prioritize maintaining transmissions on the primary cell of the MCG or the SCG over transmissions on a secondary cell and may prioritize transmissions on the PCell over transmissions on the PSCell. In case of a same priority order and for operation with two UL carriers, the WTRU may prioritize transmissions on the carrier where the WTRU is configured to transmit PUCCH. If PUCCH is not configured for either of the two UL carriers, the WTRU may prioritize transmissions on the non-supplementary UL carrier.

UL channel prioritization may be performed when safety headroom is low. A safety headroom value may be determined based on one or more of P-MPR and maximum UL duty cycle values. The safety headroom value may be interchangeably used with safety headroom, safety headroom number, safety headroom level, and safety headroom indicator.

When a safety headroom is low, e.g., a high P-MPR value or low maximum UL duty cycle, a WTRU may not be able to indicate to the network its safety headroom status due to limited transmission power. In such a scenario, one or more implementations may be used by the WTRU to maintain connectivity. One or more of uplink channels and/or signals may be prioritized based on safety headroom level. A white list and a black list of channels or signals may be defined based on the safety headroom level and the channels or signals in the white list may transmit for a given safety headroom level while the channels or signals in the black list may be dropped. The white list and black list of channels or signals may be determined based on one or more of following: physical channel types such as, for example, PUCCH, PUSCH, SR, and PRACH; uplink traffic types such as, for example, eMBB traffic, and URLLC traffic; use cases such as, for example, NR Uu, NR V2X; and TTI length such as, for example, short TTI and long TTI. One or more safety headroom levels may be used and the set of channels or signals for white list and black list may be determined based on safety headroom level.

A white/black list of channels/signals may be based on the safety headroom level. A first safety headroom level which may be, for example, 20%, may have an associated while list of channels/signals which comprise control and data for URLLC traffic, and an associated black list of channels/signals which may comprise control and data for eMBB traffic. A second safety headroom level which may be, for example, 10%, may have an associated white list of channels/signals comprising control for URLLC traffic such as, for example, HARQ feedback, and an associated black list of channels/signals comprising the remainder of channels/signals.

A data channel such as, for example, PUSCH, may be dropped, while a control channel such as, for example, PUCCH, may be transmitted when a safety headroom is lower than a threshold. A CSI feedback may be dropped while a HARQ feedback and scheduling request (SR) may be transmitted when a safety headroom is lower than a threshold.

A keep alive signal such as, for example, a preconfigured signal, may be transmitted for a component carrier (or a cell) when a downlink RSRP is higher than a threshold, e.g., while one or more of following conditions are met: uplink maximum transmission power is lower than a threshold; uplink transmission is limited due to the maximum duty cycle; or an uplink transmission power is less than the required uplink transmission power, wherein the required uplink transmission power may be a transmission power determined based on path loss and preconfigured power control parameters.

Connectivity may be maintained by configuring a WTRU to drop uplink transmission(s), e.g., all uplink transmissions, other than safety headroom indication, wherein the safety headroom indication may be carried in at least one of PUSCH, PUCCH, PRACH, and SRS. The uplink channel, which may be used for safety headroom indication, may be preconfigured in a WTRU-specific manner.

Connectivity may be maintained wherein one or more component carriers are used and a WTRU prioritizes component carriers based on a safety headroom level. A component carrier may be interchangeably used with a cell. A master cell group (MCG) may be prioritized and transmission(s) (e.g., any transmission) in the secondary cell group (SCG) may be dropped. A cell with a lowest index in a cell group such as, for example, MCG or SCG, may be prioritized. A transmission in a cell with a higher index in the cell group may be dropped.

The WTRU may apply logical channel restrictions such that certain, e.g., only certain, logical channels and/or MAC control elements (e.g. signaling radio bearers or certain data radio bearers based on priority or explicit indication) may be multiplexed in a transport block.

A WTRU may be configured to manage power reduction. A WTRU may be configured to apply a maximum level of power reduction (P-MPR), where the maximum level may vary as a function of a time pattern. This may enable transmission of control or data information (e.g., higher priority control or data information) during time instances where the maximum power reduction is configured to be lower (or zero), e.g., while ensuring that enough power reduction is applied over time to satisfy SAR or MPE requirements.

A time pattern may be defined using time units such as a frame, subframe, slot or symbol. For example, it may be expressed as at least one set of time occasions of duration, d, recurring according to periodicity, p, and offset, q, where d, p and q may be represented in terms of different time units. A time pattern may be defined using a bitmap of length B starting from a reference time such as, for example, the start of a certain frame number, and may recur periodically.

A time pattern may be associated with a maximum level of power reduction, such as, for example, 3 dB or 0 dB. The WTRU may apply a level of power reduction up to the maximum level during time instances defined by the time pattern. In other time instances, e.g., instances outside of any configured time pattern, the WTRU may apply an arbitrary amount of power reduction, such that the SAR and/or MPE requirements are satisfied when considering an average over a longer time window.

The WTRU may be configured with a set of logical channel restrictions associated with a time pattern, e.g., to ensure that the resources provided by the network in the time instances part of a time pattern are used efficiently. Data from a logical channel may be restricted or multiplexed in a grant received during an occasion of a time pattern. The restriction or allowance may be explicit, e.g., based on RRC information element, or implicit such as, for example, based on logical channel priority or type. A signaling radio bearer may be implicitly specified, or data radio bearers of priority higher than a threshold may be specified.

Parameters used for the definition of the time pattern, e.g., the set of periodicities, offsets, durations, bitmaps, etc., associated maximum level of power reduction, and/or logical channel restrictions may be signaled by RRC or MAC.

A WTRU may be configured to provide assistance for determination of a time pattern. A WTRU may signal at least one of the following: a recommended time pattern from a set of pre-configured time patterns that would need to be configured to ensure that MPE/SAR requirements are met; a recommended maximum level of power reduction applicable for the time pattern; and a maximum time-averaged transmission power level such that MPE/SAR requirements are met.

Accordingly, disclosed herein are systems and implementations for performing radiation exposure monitoring that accommodate operating in multiple frequency bands. A WTRU may be configured to monitor radiation exposure by determining an averaged power over an evaluation period. The radiation may be measured over a moving averaging window. The averaged measured power may be compared against SAR or MPE limits which may be defined in terms of normalized fractions or ratios in dB. The WTRU may be configured to measure for an averaged power periodically and/or in response to triggers.

It will be appreciated that while illustrative embodiments have been disclosed, the scope of potential embodiments is not limited to those explicitly set out. For example, while the system has been described with reference to a FR1, FR2, SAR, MPE, and P-MPR, the envisioned embodiments extend beyond implementations using these technologies. The potential implementations extend to all types of service layer architectures, systems, and embodiments. The techniques described herein may be applied independently and/or used in combination with other resource configuration techniques.

It is understood that the entities performing the processes described herein may be logical entities that may be implemented in the form of software (i.e., computer-executable instructions) stored in a memory of, and executing on a processor of, a mobile device, network node or computer system. That is, the processes may be implemented in the form of software (i.e., computer-executable instructions) stored in a memory of a mobile device and/or network node, such as the node or computer system, which computer executable instructions, when executed by a processor of the node, perform the processes discussed. It is also understood that any transmitting and receiving processes illustrated in the FIGURES may be performed by communication circuitry of the node under control of the processor of the node and the computer-executable instructions (e.g., software) that it executes.

The various techniques described herein may be implemented in connection with hardware or software or, where appropriate, with a combination of both. Thus, the implementations and apparatus of the subject matter described herein, or certain aspects or portions thereof, may take the form of program code (i.e., instructions) embodied in tangible media, or any other machine-readable storage medium wherein, when the program code is loaded into and executed by a machine, such as a computing device, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable devices, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computing systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Although the features and elements may be described herein in particular combinations, each feature or element may be used alone, without the other features and elements, and/or in various combinations with or without other features and elements.

In describing preferred embodiments of the subject matter of the present disclosure, as illustrated in the FIGURES, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A wireless transmit receive unit (WTRU) comprising:
   a processor configured at least to:
   receive information indicating a power density value;
   receive an indication of a threshold fraction of the power density value;
   determine a duty cycle;
   determine a measured power density associated with the duty cycle;
   determine the measured power density satisfies the threshold fraction of the power density value;
   generate a report associated with a determination that the measured power density satisfies the threshold fraction of the power density value; and
   transmit the report.

2. The WTRU of claim 1, wherein the power density value is a power density threshold value.

3. The WTRU of claim 1, wherein the processor configured to determine the duty cycle is further configured to receive information indicating the duty cycle.

4. The WTRU of claim 1, wherein the measured power density is associated with measurements taken over a period of time.

5. The WTRU of claim 1, wherein the information indicating the power density value comprises information indicating a maximum permitted exposure (MPE).

6. The WTRU of claim 1, wherein the report indicates an available power density.

7. The WTRU of claim 6, wherein the available power density is indicated as a fraction of the power density value.

8. The WTRU of claim 1, the processor is further configured to:
   if the WTRU receives an acknowledgment before a time period elapses, apply a modified configuration.

9. The WTRU of claim 8, wherein the modified configuration is received by the WTRU from a network device.

10. The WTRU of claim 8, wherein the time period is measured from a time that the report is transmitted.

11. A method comprising:
    receiving, by a wireless transmit and receive unit (WTRU), information indicating a power density value;
    receiving, by the WTRU, an indication of a threshold fraction of the power density value;
    determining, by the WTRU, a duty cycle;
    determining, by the WTRU, a measured power density associated with the duty cycle;
    determining, by the WTRU, that the measured power density satisfies the threshold fraction of the power density value;
    generating, by the WTRU, a report associated with determining that the measured power density satisfies the threshold fraction of the power density value; and
    transmitting, by the WTRU, the report.

12. The method of claim 11, wherein the power density value is a power density threshold value.

13. The method of claim 11, wherein determining the duty cycle comprises receiving information indicating the duty cycle.

14. The method of claim 11, wherein the measured power density is associated with measurements taken over a period of time.

15. The method of claim 11, wherein the information indicating the power density value comprises information indicating a maximum permitted exposure (MPE).

16. The method of claim 11, wherein the report indicates an available power density.

17. The method of claim 16, wherein the available power density is indicated as a fraction of the power density value.

18. The method of claim 11, further comprising:
    if the WTRU receives an acknowledgment before a time period elapses, applying a modified configuration.

* * * * *